March 27, 1962
E. R. BARNETT ETAL
3,026,859
INTERNAL COMBUSTION ENGINE
Filed May 10, 1960
2 Sheets-Sheet 1
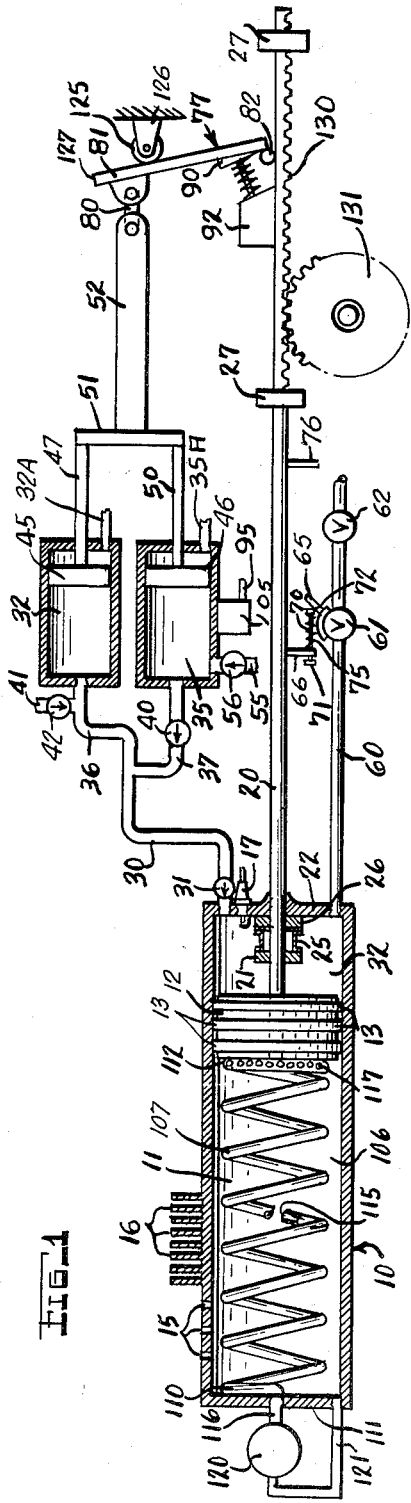
INVENTOR.
EUGENE R. BARNETT &
BY CHARLES E. HENDERSHOT
Lockwood, Woodard, Smith & Weikart
ATTORNEYS March 27, 1962     E. R. BARNETT ETAL     3,026,859
INTERNAL COMBUSTION ENGINE
Filed May 10, 1960                               2 Sheets-Sheet 2
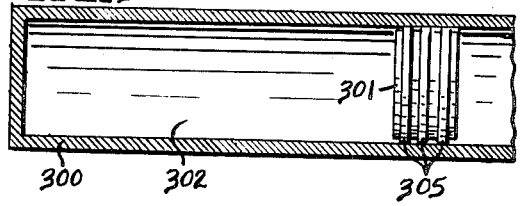
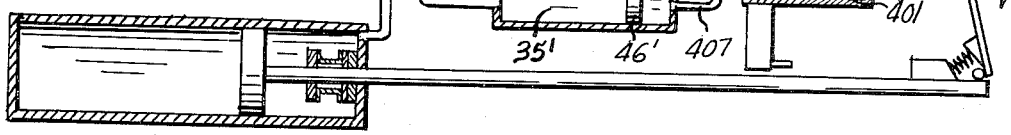
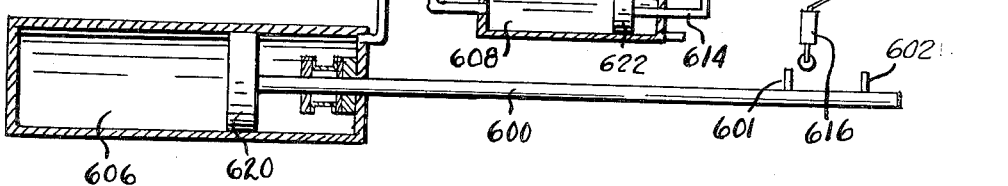
INVENTORS.
EUGENE R. BARNETT, +
BY CHARLES E. HENDERSHOT
Lockwood, Woodard, Smith + Weikart
ATTORNEYS.

United States Patent Office 3,026,859
Patented Mar. 27, 1962

3,026,859
INTERNAL COMBUSTION ENGINE
Eugene Robert Barnett, 6268 Windsor Drive, Indianapolis, Ind., and Charles Evans Hendershot, R.R. 3, Nashville, Ind.
Filed May 10, 1960, Ser. No. 28,098
6 Claims. (Cl. 123—39)

The present invention relates to improvements in internal combustion engines and to certain subcombinations thereof.

Conventional internal combustion engines involve in practically all cases either the well known four cycle or two cycle systems of operation. In both types of engines, the power is not delivered smoothly because high pressure is exerted on the piston for only a portion of the combustion stroke and the pressure exerted is not uniform throughout the power stroke. Flywheels and the like must be used to carry the piston through the non-power stroke or strokes and in order to get true smoothness of operation, six or eight cylinders are used.

It is, therefore, one object of the present invention to provide an improved internal combustion engine.

A further object of the present invention is to provide an internal combustion engine providing smoothness of operation with one cylinder.

Still another object of the invention is to provide an internal combustion engine which is economical on fuel, highly efficient and durable and is inexpensive to construct.

A further object of the present invention is to provide an improved spring or resilient means incorporating novel means for the cooling thereof.

Another object of the present invention is to provide a novel spring or resilient means.

A further object of the present invention is to provide a novel spring arrangement.

Still another object of the present invention is to provide an internal combustion engine permitting many and varied ways for the removal of energy therefrom.

Related objects and advantages will become apparent as the description proceeds.

One embodiment of the present invention includes an internal combustion engine having a cylinder, a piston reciprocably received in the cylinder and means for moving a combustible charge into the cylinder on one side of the piston to force the piston toward one end of the cylinder. The invention also includes a resilient means proportioned and arranged to force the piston toward the other end of the cylinder.

The full nature of the invention will be understood from the accompanying drawings and the following description and claims:

FIG. 1 is a somewhat schematic side elevation of an internal combustion engine embodying the present invention.

FIG. 2 is an enlarged side elevation of a portion of the structure illustrated in FIG. 1.

FIG. 2A is a fragmentary top view of a release pin forming a part of the structure of FIG. 2.

FIG. 3 is a fragmentary side elevation of an alternative embodiment of the invention.

FIG. 4 is an end view of a portion of the structure illustrated in FIG. 3.

FIG. 5 is a fragmentary side elevation of a further alternative embodiment of the invention.

FIGS. 6, 7 and 8 are somewhat schematic side elevations of still further alternative embodiments of the invention.

Referring now to the drawings, this invention comprises a cylinder 10 defining a chamber 11. It should be understood that as used herein, the word "cylinder" is used to mean the piston chamber of an engine and does not infer any particular cross sectional shape such as, for example, a circular right cross sectional shape. A piston 12 is reciprocably received within the cylinder 10 and is provided with conventional piston rings 13. The cylinder 10 is provided with a plurality of air vents 15 which allow free passage of air therethrough as the piston 12 moves back and forth within the chamber.

Various types of cooling means may be provided for the engine of the present invention. For example, in the embodiment illustrated in FIG. 1, there is provided a plurality of heat transfer fins 16 whereby the engine may be cooled by air passing adjacent thereto. It should be understood, however, that various other types of cooling means might be used, for example, a conventional water jacket could be provided for the engine.

The particular embodiment of the invention illustrated in FIG. 1 operates under the diesel theory. That is, the piston is used to compress a fuel-air mixture to such an extent as to initiate combustion. It should be understood, however, that the invention also contemplates the use of a spark plug to initiate combustion as is customary in most automobile engines. 17 designates a commercial glow plug which is used for starting a low compression engine. Such a glow plug is not required for a high compression engine.

A piston rod 20 is secured to the piston 12 and extends through suitable apertures in a piston stop 21 and in the end 22 of the cylinder 10. The piston stop 21 is suitably positioned to limit the movement of the piston 12 in a rightward direction, as viewed in FIG. 1, and is fixedly mounted by a suitable annular support 25 upon a bearing 26 which is fixed to the end 22 of the cylinder 10. The piston rod extends outwardly of the cylinder a substantial distance and is received within suitable damping bearings 27 which prevent the vibration of the piston rod from becoming excessive.

A fuel and air intake conduit 30 is arranged to open into the cylinder 10 at its end 22 and is provided with a check valve 31 at its mouth. The check valve 31 is so arranged as to allow flow of fuel and air into the cylinder on the side 32 of the piston but so as to prevent the flow of fluid from the cylinder into the conduit 30. An air cylinder 32 and a fuel cylinder 35 are fixedly secured relative to the cylinder 10 and have outlet conduits 36 and 37 which lead into the conduit 30.

The conduit 37 is provided with a check valve 40 which allows passage of fuel from the fuel cylinder 35 to the conduit 30 but prevents passage of fuel in a reverse direction. A conduit 41 opens into the conduit 36 from atmosphere and is provided with a check valve 42 which allows passage of air into the conduit 36 but prevents passage of air in a reverse direction. It should be understood that the various diameters of the cylinders 10, 32 and 35 have been shown out of proportion to better illustrate the invention. Actually, the diameter of these cylinders would vary as to the type of fuel used. For example, if the fuel used is gasoline, the diameter of the fuel cylinder might be one thirty-second of an inch, of the air cylinder four inches and of the combustion cylinder six inches. Each of cylinders 32 and 35 is provided with a vent 32A and 35A to atmosphere.

The air cylinder 32 and the fuel cylinder 35 are each provided with a piston 45 and 46. Each of the pistons 45 and 46 has connected thereto a piston rod 47 and 50, the piston rods being fixed together for simultaneous movement by a connecting element 51 which is also fixed to an elongated rod 52. It can be seen that when the pistons 45 and 46 are moved leftwardly by means of the elongated rod 52, fuel and air may be pumped from the cylinders into the conduits 36, 37 and 30, and if the pressure within the conduit 30 is greater than the pressure within the portion 32 of the cylinder, into that portion.

When the elongated rod 52 is moved rightwardly, air will be drawn through the check valve 42 into the air cylinder 32 and fuel will be drawn through conduit 55 and check valve 56 into the fuel cylinder 35. It should be noted that the check valve 56 is so arranged as to allow passage of fuel into the fuel cylinder 35 but to prevent passage of fuel in a reverse direction. A conduit 60 is secured to the cylinder 10 and is arranged to open into the cylinder on the side 32 of the piston. The flow of fluid through the conduit 60 is controlled by means of a valve 61 and a valve 62. The valve 61 is a commercial type of valve which is closed for the passage of fluid when its actuating arm 65 is in the position of FIG. 1 but is open for the passage of fluid when the actuating arm 65 is thrown to a leftward position. The valve 62 is a variable valve which may be adjusted to regulate the amount of fluid passing through the conduit 60.

The piston rod 20 has secured thereto a projecting element 66 which has reciprocably mounted thereon an elongated member 70 having enlarged portions 71 and 72 at the ends thereof. A compression spring 75 is received about the rod 70 and acts against the projection 66 and the enlarged portion 72 to normally maintain the rod in a rightwardly extended position with the enlarged portion 71 bearing against the projecting element 66. When the piston rod moves rightwardly to the position of FIG. 1, the enlarged portion 72 engages the actuating arm 65 moving it to the rightward position shown wherein the valve 61 is closed. As the piston 12 moves rightwardly to engagement with the stop 21, the compression spring 75 is compressed and the arm 65 remains in a rightward valve-closed position.

The piston rod 20 is also provided with a projecting element 76 which is spaced a suitable distance from the projecting element 66 so that when the piston is completing a combustion stroke, the element 76 will engage and operate the lever 65 to a leftward valve-open position so as to allow passage of fluid through the conduit 60. It can be seen that the piston rods 20, 47 and 50 and the elongated rod 52 are parallel and movable in the same direction. The piston rod 20 is operatively connected to the elongated rod 52 for movement therewith by means of connecting structure 77.

This structure includes a link 80 which is pivoted at its ends to the elongated rod 52 and to a lever 81 which is in turn pivoted to the piston rod 20 at 82. The lever 81 is pivotal between two positions, one of which is substantially perpendicular to the piston rod 20 and the other of which is extending somewhat leftwardly as shown in FIGS. 1 and 2. When the piston rod 20 is moving leftwardly, the lever 81 is held in the leftward tilting position as illustrated by means of a spring-loaded pin 85 which is held within a suitable indentation within a lock pin 86 by means of a spring 87. The lock pin 86 is fixed to a block 90 secured to the lever 81 and extends into a suitable bore 91 in a block 92 within which the spring 87 and pin 85 are received.

Secured to the fuel cylinder 35 and fixed with relation to the cylinder 10 is a release pin 95 which has a small extension 96 extending perpendicularly of the pin from the distal end thereof. When the piston 12 moves to the leftward end of its travel, the pin 95 will be inserted within a suitable bore 97 in the block 92 and the projection 96 will cam against an indentation 100 in the spring-loaded pin 85, moving the pin out of its indentation in the lock pin 86. A compression spring 101 is received about the lock pin 86 between the blocks 92 and 90 and upon release of the pin 86, urges the block 90 away from the block 92 and to a position wherein the lever 81 abuts the piston rod 20 and extends perpendicularly of the piston rod with the lower end 102 of the lever in engagement with the piston rod.

The release pin 95 is mounted upon a stop block 105 which is in turn mounted upon the fuel cylinder 35. The stop block 105 determines the extent of leftward movement of the piston 12 in that the block 92 which is secured to the piston rod 20 will engage the block 105 preventing further leftward movement of the piston. Received within the cylinder 10 on the side 106 of the piston 12 is a compression spring 107 having one end 110 abutting the end 111 of the cylinder 10 and having its other end 112 abutting the piston 12. The spring 107 has a hollow interior 115 which is connected at one end to a conduit 116 and, at its other end, leads to apertures 117 which open into the chamber 11.

Oil or other cooling lubricant may be pumped by means of pump 120 through the conduit 116 into the spring 107 and will pass from the spring through the apertures 117 providing lubricant for the piston. The oil is drained from the cylinder through the line 121 which opens into the cylinder at the bottom thereof and leads to the pump 120. Suitable cooling means may be provided along the line 121 in order to reduce the temperature of the oil. It can be appreciated that as the piston 12 reciprocates within the cylinder, the spring 107 will be repeatedly compressed and will generate a substantial amount of heat which must be removed from the spring in order to prevent melting or permanent deformation thereof.

Assume that the engine of FIG. 1 is in operation and that the piston 12 is moving leftwardly through a combustion stroke, the various parts of the device will be in the position illustrated in FIGS. 1 and 2. The lever 81 will be locked in the leftwardly extending position by means of the pin 85 being received in the indentation in the pin 86. As the piston moves leftwardly, the piston rod 20 will cause leftward movement of the lever 81, the link 80, the rod 52 and the air and fuel piston rods 47 and 50 causing air and fuel to be pumped through the conduits 36 and 37, through conduit 30 and check valve 31 into the chamber 11 on the side 32 of the piston. It has been found that, during operation of the present device, the pressure on the side 32 of the piston actually increases a small amount during the combustion stroke. It can be appreciated, however, that the incoming fuel-air mixture will be injected into the chamber 11 smoothly and uniformly and will cause the pressure on the side 32 of the piston to remain substantially constant during the complete combustion stroke because combustion of the fuel-air mixture will take place throughout the complete combustion stroke.

As the piston nears the end of the combustion stroke, the pin 95 will enter the bore 97 and cam against the indentation in the pin 85 causing the lever 81 to be moved to a perpendicular position with relation to the piston rod 20. Also the projecting element 76 will engage the actuating arm 65 of the valve 61 throwing the valve to open position and allowing the compressed gas on the side 32 of the piston to exhaust from the chamber. The spring 107 will have stored therein a substantial amount of potential energy which is used to move the piston 12 back through the rightward stroke.

When the block 92 engages the block 105, the combustion stroke will be finished and the spring 107 will act on the piston moving it rightwardly. As the piston moves rightwardly, the burned gases on the side 32 of the piston will be exhausted through the conduit 60 and through the open valve 61. It should be understood that in actual operation, the blocks 105 and 92 may or may not engage one another and that the piston 12 and stop 21 may or may not engage one another. In other words, the stroke may be completed before actual engagement occurs.

As the piston 12 nears the end of the exhaust stroke, the rod 70 will engage the actuating arm 65 of the valve 61 throwing the arm to a rightward valve-closed position. At the same time, the lever 81 will engage a roller 125 rotatably mounted upon the block 126 which is fixed with relation to the cylinders 10, 32 and 35. It can be seen that as the lower end 102 of the lever 81 continues its rightward movement with the piston rod 20, the upper end 127 of the lever 81 will pivot about the roller 125 and will move leftwardly.

As the upper end 127 of the lever moves leftwardly, it transmits its motion through the link 80, rod 52, piston rods 47 and 50 and pistons 45 and 46 causing air and fuel to be pumped into the chamber 11 on the side 32 of the piston as explained above. Thus, it can be seen that the end portion of the rightward stroke of the piston 12 is a compression stroke because of the fact that the valve 61 is closed and fuel-air mixture is being injected into the chamber on the side 32 of the piston. When the piston 12 reaches the stop 21 to end the rightward stroke, the fuel-air mixture will be sufficiently compressed to again begin combustion and to start the piston again moving lifewardly through the combustion stroke. As the piston moves leftwardly into the position illustrated in FIG. 1, the pin 85 will lock within the indentation of the pin 86 so as to lock the lever 81 in the leftwardly tilting position illustrated in FIGS. 1 and 2.

It should be understood that energy can be taken from this engine in various ways. For example, the piston rod 20 is provided with a rack 130 which engages and rotates a spur gear 131 which may be connected to a suitable ratchet which is in turn connected to a driven means and to a flywheel. Alternatively, the piston rod 20 might be connected through a connecting rod to a crank shaft and no flywheel would be needed because of the fact that the combustion of the gases would drive the piston throughout its leftward combustion stroke and the spring 107 would drive the piston through the exhaust and compression stroke.

Another method of obtaining energy from the engine might be from the gases passing through the conduit 60 and would be controlled by the valve 62.

Referring to FIG. 3, an alternative embodiment of the invention comprises a torsion bar 200 having a hollow center 201 through which oil or other coolant is allowed to pass to maintain the temperature of the torsion bar at a sufficiently low level. The torsion bar is fixed at one end to a stationary block 202 which is fixed with relation to the cylinder 205 of the engine. The torsion bar is rotatably received at its other end within a suitable bearing block 202A which is also fixed with relation to the cylinder 205 of the engine. A lever 206 is fixed at one end to the torsion bar 200 and is pivoted at its other end to a rod 207 which is in turn pivoted to the piston 210 of the engine.

If desired, the rod 207 may be provided with a hollow center and with radially extending passages 211 for transmitting lubricant into the chamber 212 of the engine. In all other respects, the engine of FIG. 3 is identical or similar to the engine of FIGS. 1, 2 and 2A.

Referring now to FIG. 5, a further alternative embodiment of the invention comprises a cylinder 300 and a piston 301 reciprocally received therein. This engine is identical or similar to the engines of FIGS. 1, 2, 2A and 3 with the exception that no spring such as the compression spring 107 and no torsion bar such as the torsion bar 200 is provided. Instead, compressed air is used on the side 302 of the piston to store the energy produced by the leftward movement of the piston. It can be appreciated that the vents such as the vents 15 of FIG. 1 and the vents 215 of FIG. 3 should be eliminated and the piston rings 305 should have excellent sealing capability.

Referring now to FIG. 6, an alternative means for injecting the fuel-air mixture into the combustion chamber is illustrated. The system of FIG. 6 is similar in all respects to that above described with the exception that in place of the connecting element 51, there is provided a pneumatic cylinder 400 having a piston 401 which is operated by the elongated rod 52'. As the elongated rod moves leftwardly, the piston 401 is caused to pump compressed air through conduit 402, T-connection 405 and into conduits 406 and 407 which lead into the air cylinder 32' and the fuel cylinder 35'. This incoming air causes the pistons 45' and 46' to move leftwardly and to function as above described with regard to FIG. 1.

Referring to FIG. 7, structure is illustrated which is identical in all respects to that above described with regard to FIG. 6 with the exception that hydraulic fluid is used in the chamber 500, lines 501, 502 and 503, T-connection 505 and the chambers 506 and 507 behind pistons 45' and 46'.

Referring to FIG. 8, a further means for actuating the fuel-air injection is illustrated and comprises a piston rod 600 having a pair of cams 601 and 602 extending upwardly therefrom. A reversible electric motor 605 is fixedly mounted with relation to the engine cylinder 606, the air cylinder 607 and the fuel cylinder 608. The reversible electric motor has a spur gear 610 secured to its shaft and arranged to move the piston rod 611 by acting on the rack 612 on the lower surface of the rod. The piston rod 611 has a depending rod 615 secured thereto which is fixed to piston rod 614 arranged parallel to the rod 611.

The operation of the motor 605 is controlled by a micro-switch 616 which is operated by means of cams 601 and 602 fixed to piston rod 600. These cams are so arranged that the cam 601 will engage the micro-switch actuating arm when the piston 620 finishes the exhaust portion of the rightward stroke and the motor 605 will cause the piston rod 611 to begin leftward movement pumping air-fuel mixture into the cylinder 606 during the compression portion of the rightward stroke. The reversible electric motor will continue to operate to move the pistons 621 and 622 leftwardly until the cam 602 engages the actuating arm of the micro-switch when the piston 620 reaches the leftward end of the combustion stroke. At this time, the motor will be reversed by the micro-switch and the pistons 621 and 622 will move rightwardly to move air and fuel into the respective air and fuel cylinders.

It should be understood that the various engines of FIGS. 3–8 are equipped with suitable check valves such as check valves 31, 40, 42 and 56. It should also be noted that each of these engines also has an exhaust valve or valves such as valves 61 and 62. Each of the engines of FIGS. 6–8 may be equipped with the coil spring of FIG. 1, the torsion bar of FIGS. 3 and 4 or the compressed air arrangement of FIG. 5.

From the above description, it can be appreciated that the present invention provides an improved internal combustion engine. It can also be seen that the internal combustion engine of the present invention will give a smoothness of operation not present in conventional single cylinder engines. It can also be seen that the internal combustion engine of the present invention is highly efficient and durable and is inexpensive to construct and provides many and varied ways for the removal of energy therefrom.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An internal combustion engine comprising a cylinder, a piston reciprocably received in the cylinder, means for injecting a combustible charge into the cylinder on one side of the piston to force the piston toward one end of the cylinder, a torsion bar having one end fixed with relation to the cylinder, a piston rod pivoted to said piston and extending out of said cylinder, and a lever fixed to said torsion bar centrally thereof and pivoted to said piston rod.

2. An internal combustion engine as defined in claim 1 in which the torsion bar is hollow, and means for pumping liquid coolant through said hollow torsion bar.

3. An internal combustion engine comprising a cylinder, a piston reciprocably received in the cylinder, means for injecting a combustible charge into the cylinder on one side of the piston to force the piston toward one end of the cylinder, and a coiled compression spring received within the cylinder on the other side of the piston to force the piston toward the other end of the cylinder, the compression spring being hollow and having a plurality of apertures therein adjacent said piston and leading from the hollow interior of said spring to the outside thereof, and means for pumping a cooling lubricant into the hollow interior of said spring.

4. An internal combustion engine comprising a first cylinder, a piston reciprocably received in the first cylinder for movement through a combustion stroke and an exhaust stroke, a fuel cylinder, an air cylinder, conduits leading from said fuel cylinder and air cylinder into said first cylinder, said piston being operatively connected to said fuel cylinder and air cylinder for pumping a fuel-air mixture into said first cylinder as said piston finishes an exhaust stroke and throughout a substantial portion of a combustion stroke, and resilient means proportioned and arranged to force the piston through the exhaust stroke, the operative connection of said piston, fuel cylinder and air cylinder being a mechanical linkage, said linkage comprising a piston rod secured to said first piston, a piston and piston rod reciprocably received in each of said fuel cylinder and said air cylinder, all of said piston rods being parallel and reciprocal in the same direction, an element connecting said first piston rod and said fuel and air cylinder piston rods, said element extending perpendicularly of said first piston rod and pivoted thereto, and a stop member fixed with relation to said cylinders and positioned to engage said element each time said first piston nears completion of an exhaust stroke.

5. A spring arrangement comprising a pair of elements, a coiled resilient member received between said elements, means for causing relative movement of said elements with respect to one another against the urging of said resilient member, said resilient member being hollow and having a plurality of apertures adjacent one of said elements, and means stationary with respect to the other of said elements for pumping a cooling lubricant into the hollow interior of said spring.

6. A lubricating system comprising a cylinder, a piston reciprocable in said cylinder, a spring arrangement biasing said piston axially of said cylinder, means for causing movement of said piston against the bias of said spring arrangement, said spring arrangement including a hollow member received within said cylinder and having a plurality of apertures leading from the hollow interior of said member and opening into said cylinder, and means for pumping a cooling lubricant into the hollow interior of said member.

References Cited in the file of this patent

UNITED STATES PATENTS

| | | |
|---|---|---|
| 339,762 | Goewey | Apr. 13, 1886 |
| 588,061 | Hart | Aug. 10, 1897 |
| 1,178,181 | Rites | Apr. 4, 1916 |
| 1,265,092 | Koenig | May 7, 1918 |
| 1,314,801 | Hanzlik | Sept. 2, 1919 |
| 1,502,264 | Moore | July 22, 1924 |
| 1,512,879 | Corniere | Oct. 21, 1924 |
| 1,827,560 | Binckley | Oct. 13, 1931 |
| 2,009,929 | Johnson | July 30, 1935 |
| 2,219,816 | Mould | Oct. 29, 1940 |
| 2,355,177 | Pescara | Aug. 8, 1944 |
| 2,599,159 | Breedlove | June 3, 1952 |